(12) United States Patent
Kupasrimonkol

(10) Patent No.: US 11,740,784 B1
(45) Date of Patent: Aug. 29, 2023

(54) EXTENDED PULL-DOWN GESTURE TO CACHE CONTENT

(71) Applicant: Meta, Platforms, Inc., Menlo Park, CA (US)

(72) Inventor: Sirisak Mark Kupasrimonkol, Long Island City, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/526,849

(22) Filed: Nov. 15, 2021

(51) Int. Cl.
*G06F 3/04883* (2022.01)
*G06F 16/957* (2019.01)
*G06Q 50/00* (2012.01)

(52) U.S. Cl.
CPC ...... *G06F 3/04883* (2013.01); *G06F 16/9574* (2019.01); *G06Q 50/01* (2013.01)

(58) Field of Classification Search
CPC .. G06F 3/04883; G06F 16/9574; G06Q 50/01
See application file for complete search history.

(56) References Cited

U.S. PATENT DOCUMENTS

| | | | |
|---|---|---|---|
| 8,428,626 B2 | 4/2013 | Pascal et al. | |
| 9,948,742 B1 | 4/2018 | Bueche et al. | |
| 10,223,458 B1 * | 3/2019 | Decker | G06F 16/9535 |
| 10,291,737 B2 | 5/2019 | Filner et al. | |
| 2010/0199180 A1 * | 8/2010 | Brichter | G06F 3/0482 |
| | | | 715/702 |
| 2013/0246970 A1 * | 9/2013 | Helle | G06F 3/0482 |
| | | | 715/822 |
| 2014/0108997 A1 * | 4/2014 | Beaver | G06F 3/0485 |
| | | | 715/784 |
| 2014/0282281 A1 | 9/2014 | Ram et al. | |
| 2015/0193137 A1 * | 7/2015 | Schimon | G06F 3/0488 |
| | | | 715/833 |
| 2015/0355806 A1 * | 12/2015 | Ormand | G06F 3/038 |
| | | | 715/863 |
| 2017/0171342 A1 * | 6/2017 | Wang | H04L 67/568 |
| 2017/0192642 A1 | 7/2017 | Fishman et al. | |
| 2017/0192668 A1 * | 7/2017 | Rao | G06F 3/04883 |
| 2017/0255681 A1 * | 9/2017 | Giunio-Zorkin | G06F 16/248 |
| 2018/0343294 A1 * | 11/2018 | Rands | H04N 21/4788 |
| 2020/0310835 A1 | 10/2020 | Momchilov | |
| 2021/0092024 A1 * | 3/2021 | Delaney | H04L 67/5681 |

* cited by examiner

*Primary Examiner* — Andrew T Chiusano
(74) *Attorney, Agent, or Firm* — McDermott Will & Emery LLP

(57) ABSTRACT

Methods, systems, and storage media for caching digital content are disclosed. Exemplary implementations may: access a social media platform through a client executing on a user device; generate a feed comprising digital content; cause display of the feed through a user interface on the client executing on the user device; receive a gesture from a user; in response to the received gesture from the user, cache at least a portion of the digital content of the feed; and cause display of the cached digital content on the feed.

20 Claims, 5 Drawing Sheets

EXTENDED PULL-DOWN GESTURE TO CACHE CONTENT

TECHNICAL FIELD

The present disclosure generally relates to caching digital content and more particularly to using a long or an extended pull-down gesture in a user interface to cache content.

BACKGROUND

Users are engaging with their mobile devices in an increasing variety of locations and circumstances. Additionally, with mobile devices such as smartphones, having the capability to display rich digital media on their screens is becoming more and more prevalent across the world. Network connectivity is anything but fully ubiquitous, meaning that there will inevitably be locations and circumstances where connectivity will be less than desirable. Conventionally, social media platforms deliver streams of content to users via a connection to the internet. These platforms provide a convenient means for users to view, share and interact with digital content. As image quality and use of videos and live-photos becomes more prevalent, delivering digital content to and from users can become a resource-intensive process. The user experience for the platform can be dependent on the quality of the network which the user is connected. In some cases, loss of network connectivity can prohibit use of a social media platform altogether and negatively impact the user's impression of or engagement with the social media platform.

BRIEF SUMMARY

The subject disclosure provides for systems and methods for caching digital content. A user is able to direct the caching of digital content from within the client executing on a mobile device. In this way, when the user is in a situation where the mobile device has a sufficient level of connectivity and/or bandwidth availability, the user has the ability to proactively direct the caching of digital content for viewing later (perhaps when connectivity or bandwidth is more limited). To make this process easy for the user, a gesture similar to the refresh content gesture is used. Digital content can thus be refreshed and cached, allowing the store of cached digital content to be populated with unviewed media. A downward swipe ("pull") gesture from the top of the screen is generally used to refresh the digital content. An extended (e.g., long or mega) downward swipe gesture accompanied by some indicator (visual, audible, haptic) can be used to initiate the caching.

One aspect of the present disclosure relates to a method for caching digital content. The method may include accessing a social media platform through a client executing on a user device. The method may include generating a feed comprising digital content. The method may include causing display of the feed through a user interface on the client executing on the user device. The method may include receiving a gesture from a user. The gesture may include a swiping down motion. The swiping down motion may include motion exceeding the distance necessary to cause a preliminary action. The method may include, during the gesture from the user, causing a portion of the user interface to display a visual indicator to the user. The method may include, in response to the received gesture from the user, caching at least a portion of the digital content of the feed. The method may include causing display of the cached digital content on the feed.

Another aspect of the present disclosure relates to a system configured for caching digital content. The system may include one or more hardware processors configured by machine-readable instructions. The processor(s) may be configured to access a social media platform through a client executing on a user device. The processor(s) may be configured to generate a feed comprising digital content. The processor(s) may be configured to cause display of the feed through a user interface on the client executing on the user device. The processor(s) may be configured to receive a first gesture from a user. The first gesture may include a swiping down motion. The swiping down motion may include at least one of a long pull or an extended pull (e.g., a mega pull) by the user. The processor(s) may be configured to, during the first gesture, cause display of a caching indicator to indicate that the first gesture will result in a digital content caching request. The processor(s) may be configured to cause display of a configuration indicator to further configure the caching request. The processor(s) may be configured to receive a second gesture from the user based on the configuration indicator to further configure the caching request. The processor(s) may be configured to, in response to the received first gesture and second gesture from the user, cache at least a portion of the digital content of the feed. The processor(s) may be configured to cause display of the cached digital content on the feed.

Yet another aspect of the present disclosure relates to a non-transient computer-readable storage medium having instructions embodied thereon, the instructions being executable by one or more processors to perform a computer-implemented method for caching digital content. The method may include accessing a social media platform through a client executing on a user device. The method may include generating a feed comprising digital content. The method may include causing display of the feed through a user interface on the client executing on the user device. The method may include receiving a gesture from a user. The gesture may include a swiping down motion. The swiping down motion may include at least one of a long pull or an extended pull (e.g., a mega pull) by the user. The method may include, in response to the received gesture from the user, caching at least a portion of the digital content of the feed. The method may include causing display of the cached digital content on the feed.

Still another aspect of the present disclosure relates to a system configured for caching digital content. The system may include means for accessing a social media platform through a client executing on a user device. The system may include means for generating a feed comprising digital content. The system may include means for causing display of the feed through a user interface on the client executing on the user device. The system may include means for receiving a gesture from a user. The gesture may a swiping down motion. The swiping down motion may include at least one of a long pull or an extended pull (e.g., a mega pull) by the user. The system may include means for, in response to the received gesture from the user, caching at least a portion of the digital content of the feed. The system may include means for causing display of the cached digital content on the feed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Social media platforms delivering content to a mobile device can have limited usefulness during times without a stable internet connection or sufficient bandwidth to transfer digital media at a rate desirable for user consumption.

The subject disclosure provides for systems and methods for caching digital content. A user is able to initiate caching on their device based on their knowledge of current and future circumstances. When a user knows that they are currently in a situation providing sufficient internet connectivity and/or bandwidth, paired with the knowledge that at some future time they will be in a situation with limited internet connectivity and/or bandwidth, they can instruct the client on their device to cache digital content. Caching digital content in this way allows the user to continue to engage with the social media platform in times of limited connectivity or bandwidth availability.

Implementations described herein address the aforementioned shortcomings and other shortcomings by providing a feature to allow users to easily and selectively cache digital content, for example when the user is connected to a stable, high-bandwidth network.

Figure 1A:
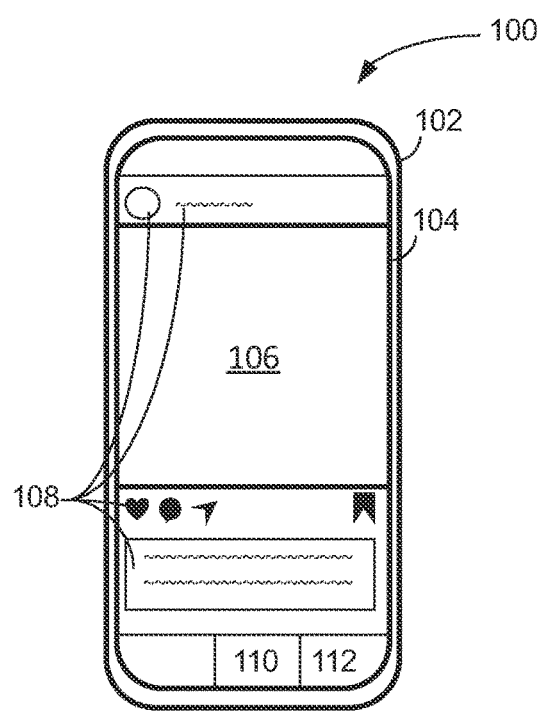
FIGS. 1A, 1B, 1C, and 1D are diagrams of an example user interface for caching digital content, according to certain aspects of the disclosure.

FIGS. 1A, 1B, 1C, and 1D (collectively, "FIG. 1") are diagrams of an example user interface 100 for caching digital content, according to certain aspects of the disclosure. In FIG. 1A, user device 102 includes a display 104 for displaying an application client. The application client includes digital content 106 having metadata 108 being displayed on an active view 110. An inactive view 112 may be additionally selectable within the application client.

The digital content 106 may comprise content which is visible, viewed, or unviewed. Each item of digital content 106 may include related metadata 108. The metadata 108 can comprise a user profile which posted the content, content description or title, comments, reactions (e.g., likes), bookmark status, tags, categories, or similar metadata. Digital content visible on the active view 110 may differ from content which may be visible on another view within the application client. The inactive view 112 may have a differing feed of digital content or differing displays of the digital content as compared with the active view 110. Selection of the inactive view 112 will make its content visible and this view will become active.

Figure 1B:
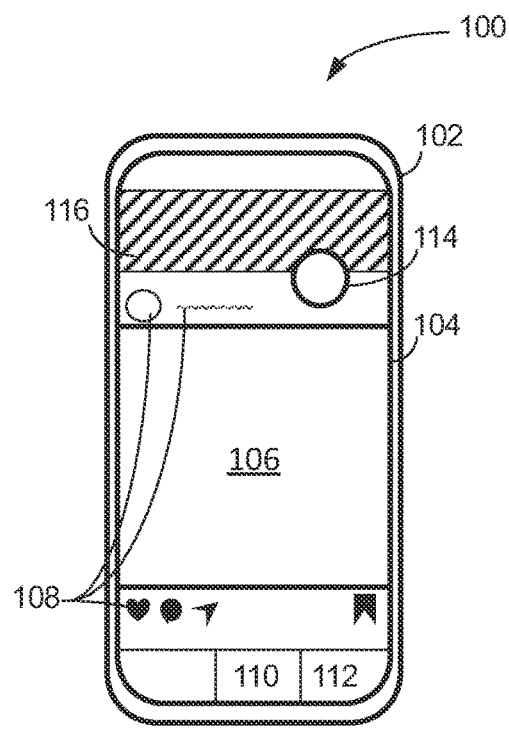

Referring to FIG. 1B, to interact with the application client, and in particular with a feed of digital content 106, the user may make a gesture on the screen 104 with their finger (represented by area 114). A downward motion from the upper area of the screen 104 may cause the digital media 106 to shift down revealing a transitionary portion 116 above the digital content 106. In some examples, the transitionary portion 116 will be displayed in a particular color and may include text or symbols to indicate that the digital content feed is being refreshed.

Figure 1C:
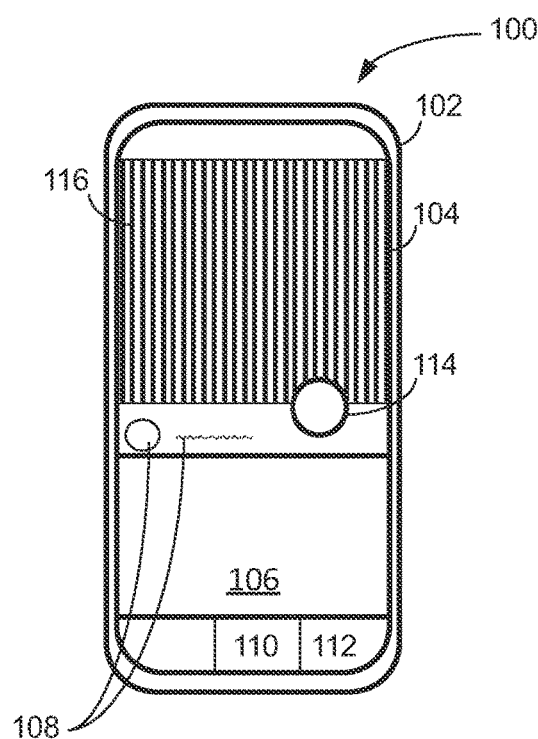

Referring to FIG. 1C, as the user continues to gesture downward (represented by area 114), a characteristic of the transitionary portion 116 may change. The extended gesture input—which may be referred to as a long pull or an extended pull (e.g., a mega pull) depending on the amount of screen 104 traversed by the gesture 114—signals to the application client that another action is intended to be requested by the user. To indicate recognition of this gesture, the transitionary portion 116 may change color, and/or another visual indicator may appear— for example the appearance of text or an icon/graphic. This color change or visual indicator is meant to identify to the user that the gesture will result in caching of digital content feed. Audible and/or haptic signals may be used in addition to (or in place of) the visual indicators. For example, a chime or vibration may help bring attention to the user that their gesture will result in an action other than simply refreshing the digital content feed. At least the first several times the feature is used by a user, text may be shown with "Load All Posts" or similar language to indicate that the digital content in the feed will be downloaded/cached based on this action.

Figure 1D:
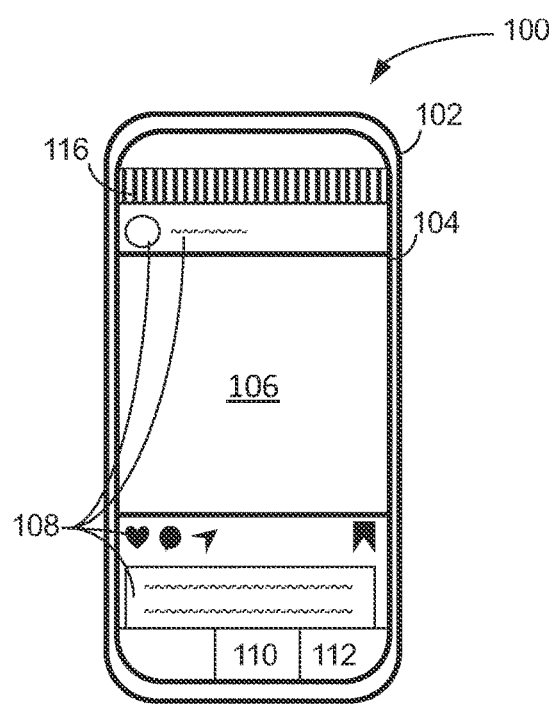

Referring to FIG. 1D, upon completion of the gesture and release by the user, the transitionary portion 116 may contract. A visual indicator (e.g., graphical indicator, text indicator, etc.)— text and/or a status icon/graphic may be present in the remaining transitionary portion 116 to allow the user to see that they have provided an instruction to the application client to cache digital content in the feed. The text in the transitionary portion 116 may include the language "Loading all Posts" or similar language. A status bar or moving progress or working indicator may also be displayed to indicate to the user that the caching is in progress. Upon completion, the completion status may be indicated to the user. In other examples, the transitionary portion 116 may simply disappear.

The digital content being cached by the extended gesture may be all digital content available within the application client. According to other examples, the digital content being cached by the extended gesture may be all digital content viewable in the active view 110. In order to cache digital content which would be viewable on an inactive view 112, the user would navigate to that view (making it active) and then initiate the extended gesture.

Figure 2A:
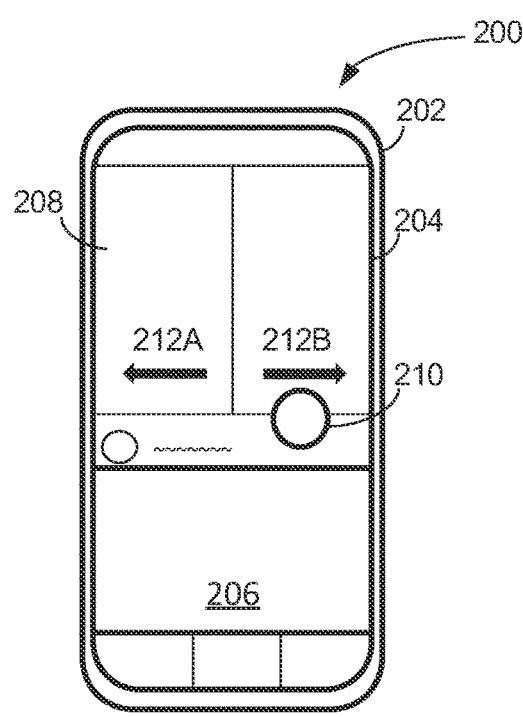
FIGS. 2A and 2B are diagrams of an example user interface for configurable caching of digital content, according to certain aspects of the disclosure.
Figure 2B:
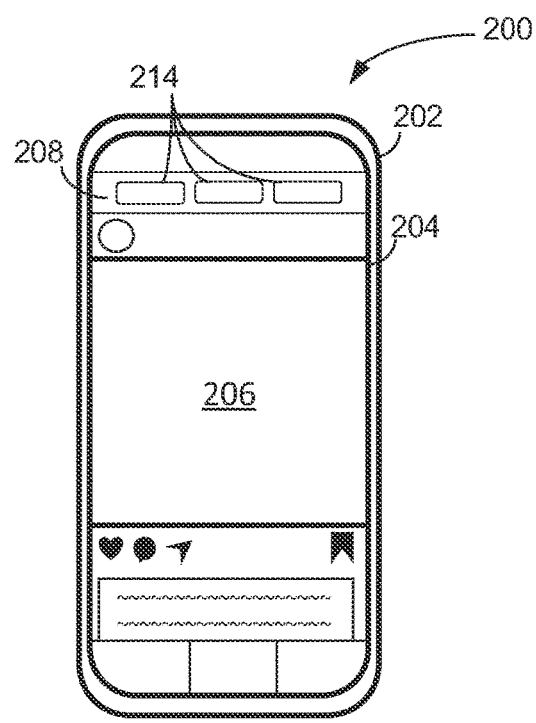

FIGS. 2A and 2B (collectively, "FIG. 2") are diagrams of an example user interface 200 for configurable caching of digital content, according to certain aspects of the disclosure. In FIG. 2A, the user device 202 includes a display 204 for displaying an application client. The application client includes digital content 206. With the presence of an extended gesture from a user (represented by area 210), transitionary portion 208 is visible with configuration indicators 212A-B.

In some implementations, as a user is engaging in an extended gesture 210, additional configurability may be presented to the user in the transitionary portion 208. The additional configurability may include a left swipe indicator 212A and/or a right swipe indicator 212B. The gesture pattern to engage the left or right swipe indicators 212A-B may be a continuation of the downward extended gesture already in motion or may be a separate gesture. In the case where the left or right swipe indicators 212A-B are engaged with a separate gesture, the transitionary portion 208 remains extended (at least for a period of time) with the left and right swipe indicators 212A-B visible for the user to independently swipe either left or right. In other examples, additional swipe gesture functionality may be provided, including an indicator to swipe up or further down to engage additional functionality. In some examples, a swipe left may instruct the caching of 50% of the digital content feed. In some examples, a swipe right may instruct the caching of 75% of the digital content feed. In some examples, a further swipe down may instruct the caching of 100% of the digital content feed. In some examples, a swipe back upward may cancel any caching of digital content. In other examples, the functionality may be rearranged between the gestures and some gestures may not be included. Additionally, the extent of the extended gesture 210 can be used to provide additional caching configurability. A "long pull" extended gesture 210 exceeds the downward swipe distance necessary to cause a preliminary action—typically a refresh. As an example, the long pull may occur when the extended gesture 210 has surpassed 40% of the display 204. This long pull may engage a first caching configuration. A "mega pull" extended gesture 210 exceeds the long pull swipe distance. As an example, the mega pull (e.g., the extended pull) may occur when the extended gesture 210 has surpassed 50% of the display 204. This mega pull may engage a second caching configuration. As the user engages the extended gesture 210, the transitionary portion 208 may include an indicator that a first or a second caching configuration are being requested based on the extent of the gesture. As an example, the first caching configuration may be to load 50% of the digital content feed and the second caching configuration may be to load 100% of the digital content feed. In other implementations, the extended gesture 210 may use continuous configurability instead of discreet configurability as in the long pull and the mega pull. In this way, the transitionary portion 208 may indicate a continuous increasing caching percentage as the user continues to swipe downward. The further the swipe, the greater percentage of digital content to be cached. In other examples, the additional gesture based configurability may adjust other aspects of the digital content being cached, such as media types, resolution, metadata and the like.

Referring to FIG. 2B, after the extended gesture is complete, the transitionary portion 208 may contract to a bar above the visible digital content 206. The transitionary portion 208 may display additional configuration options 214 to the user to allow configurability of the requested caching. In some examples, the additional configuration options 214 are buttons which the user can tap/press. In other examples the additional configuration options 214 are swipeable regions which the user may engage, and swipe left or right to perform an action. Other input methods are contemplated. In an example, the additional configuration options 214 may allow the user to select the amount of digital content to be cached—by percentage or storage amount or other quantifier. In another example, the additional configuration options 214 may allow the user to select the type of digital content to be cached—videos, photos, text. In another example, the additional configuration options 214 may allow the user to select metadata to be cached along with the digital content—comments, reactions/likes, user profiles, descriptions and titles and the like. It is contemplated that any of this configurability may also be incorporated in the extended swipe gestures discussed with respect to FIG. 2A as well. Additionally, this configurability may also be setup in an account/preferences section.

The disclosed system(s) address a problem in traditional digital content viewing techniques tied to computer technology, namely, the technical problem of being able to engage with social network platform content when internet connectivity and/or bandwidth is limited. The disclosed system solves this technical problem by providing a solution also rooted in computer technology, namely, by providing for long pull-down gesture to cache content. The disclosed subject technology further provides improvements to the functioning of the computer itself because it improves processing and efficiency in caching digital content.

Figure 3:
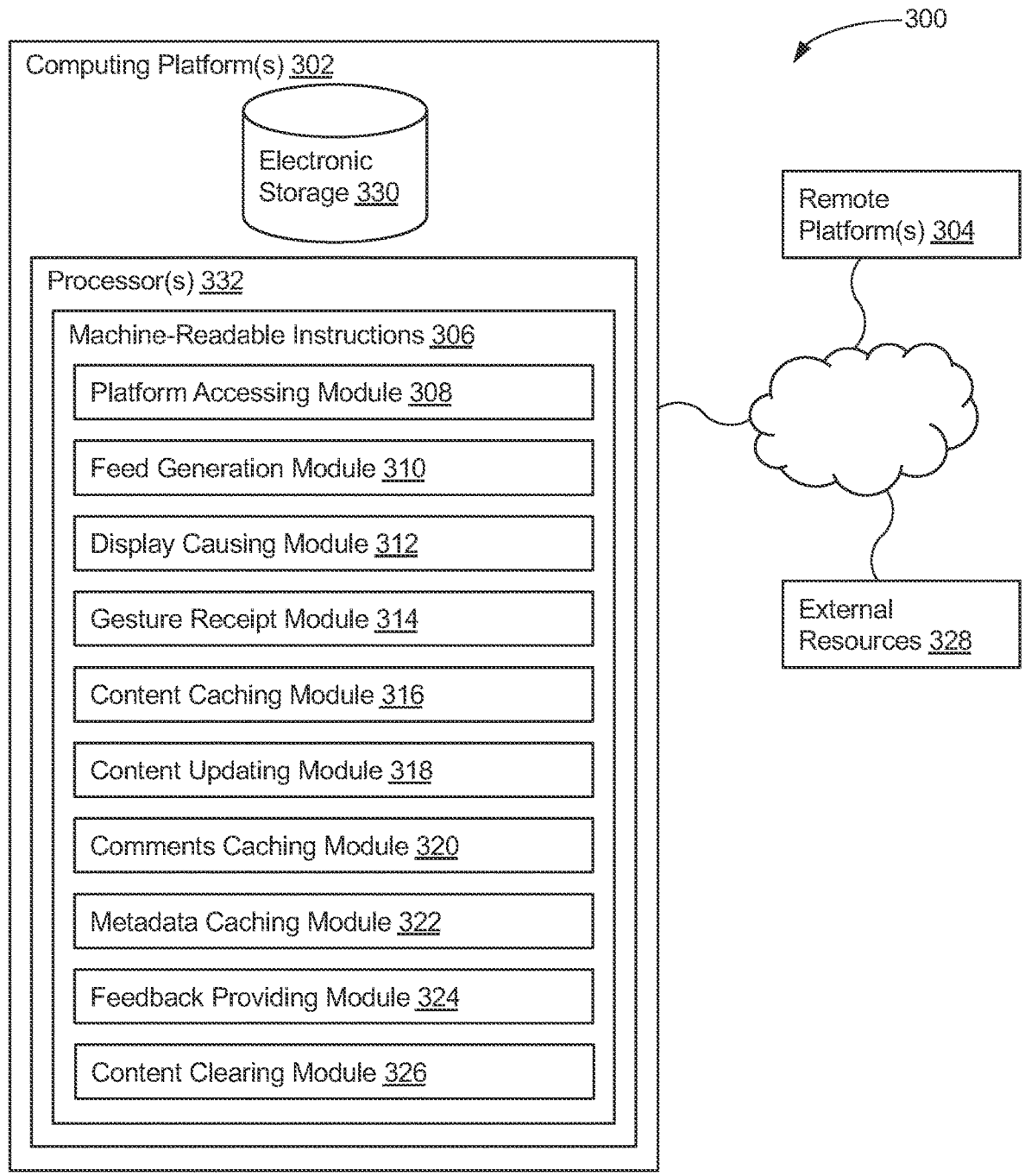
FIG. 3 illustrates a system configured for caching digital content, in accordance with one or more implementations.

FIG. 3 illustrates a system 300 configured for caching digital content, according to certain aspects of the disclosure. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of platform accessing module 308, feed generation module 310, display causing module 312, gesture receipt module 314, content caching module 316, content updating module 318, comments caching module 320, metadata caching module 322, feedback providing module 324, content clearing module 326, and/or other instruction modules.

Platform accessing module 308 may be configured to access a social media platform through a client executing on a user device.

Feed generation module 310 may be configured to generate a feed comprising digital content.

Display causing module 312 may be configured to cause display of the feed through a user interface on the client executing on the user device.

Gesture receipt module 314 may be configured to receive a gesture from a user. The gesture may include a swiping down motion. The swiping down motion may include at least one of a long pull or an extended pull (e.g., a mega pull) by the user. The long pull may include greater than 40% of an upper screen area of the user device. The extended pull may include greater than 50% of an upper screen area of the user device. A color of a portion of the user interface may change when the user applies a long pull or an extended pull. The color of the portion of the user interface which changes when the user applies long pull may be different from the color of the portion of the user interface which changes when the user applies the extended pull.

Content caching module 316 may be configured to, in response to the received gesture from the user, cache at least a portion of the digital content of the feed. The long pull may cache at least 50% of non-displayed content. The extended pull may cache all non-displayed content. The distance of the swiping down motion of the gesture may be determined based on the amount of digital content to be cached. The caching at least a portion of the digital content of the feed may be limited to digital content related to a current view in the user interface. The caching at least a portion of the digital content of the feed may be limited a user configuration.

Display causing module 312 may be configured to cause display of the cached digital content on the feed.

Content updating module 318 may be configured to, in response to the received gesture from the user, update the digital content of the feed. Depending on the state of the unviewed portion of the digital content feed, an update may or may not be necessary to perform.

Comments caching module 320 may be configured to cache comments related to the digital content of the feed.

Metadata caching module 322 may be configured to cache additional metadata related to the digital content of the feed. This metadata may include comments, reactions or likes, user profiles associated with the digital content, titles, descriptions, tags/hashtags, categories, or the like.

Gesture receipt module 314 may be configured to receive a second gesture from the user consecutively after the gesture. The second gesture may include at least one of a swipe left, swipe right, swipe up, swipe down, button press or similar gesture. The second gesture may allow the user to configure the caching. By way of non-limiting example, configuring the caching may include at least one of selecting the amount of content to be cached, adjusting expiration of cached content, selecting an amount of data to cache, selecting resolution options, selecting metadata to be cached, and selecting content type to be cached.

Display causing module 312 may be configured to cause display of a prompt to the user during swiping down motion, before the gesture is a long pull or an extended pull, to inform the user of the effect of the long pull or the extended pull.

Feedback providing module 324 may be configured to provide feedback to the user before the gesture is a long pull or an extended pull. Feedback providing module 324 may be configured to provide feedback to the user after the gesture is a long pull or an extended pull. By way of non-limiting example, the feedback may be at least one of haptic feedback, an audible sound, or a visual indicator.

Display causing module 312 may be configured to cause display of a confirmation of the caching at least a portion of the digital content of the feed. The confirmation may include a visual indicator of the digital content being cached. The visual indicator may include a download status indicator. Display causing module 312 may be configured to cause display of an indicator during the swiping down motion of the gesture to indicate the amount of digital content to be cached.

Content clearing module 326 may be configured to clear at least a portion of the cached digital content after the expiration of a period of time. Content clearing module 326 may be configured to clear at least a portion of the cached digital content after a second gesture by the user to refresh the digital content of the feed. The clearing may be restricted if the digital content of the feed is unable to be refreshed.

In some implementations, computing platform(s) 302, remote platform(s) 304, and/or external resources 328 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 328 may be operatively linked via some other communication media.

A given remote platform 304 may include one or more processors configured to execute computer program modules. The computer program modules may be configured to enable an expert or user associated with the given remote platform 304 to interface with system 300 and/or external resources 328, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 328 may include sources of information outside of system 300, external entities participating with system 300, and/or other resources. In some implementations, some or all of the functionality attributed herein to external resources 328 may be provided by resources included in system 300.

Computing platform(s) 302 may include electronic storage 330, one or more processors 332, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 330 may comprise non-transitory storage media that electronically stores information. The electronic storage media of electronic storage 330 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 330 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 330 may include one or more virtual storage resources (e.g., cloud storage, a virtual private network, and/or other virtual storage resources). Electronic storage 330 may store software algorithms, information determined by processor(s) 332, information received from computing platform(s) 302, information received from remote platform(s) 304, and/or other information that enables computing platform(s) 302 to function as described herein.

Processor(s) 332 may be configured to provide information processing capabilities in computing platform(s) 302.

As such, processor(s) 332 may include one or more of a digital processor, an analog processor, a digital circuit designed to process information, an analog circuit designed to process information, a state machine, and/or other mechanisms for electronically processing information. Although processor(s) 332 is shown in FIG. 3 as a single entity, this is for illustrative purposes only. In some implementations, processor(s) 332 may include a plurality of processing units. These processing units may be physically located within the same device, or processor(s) 332 may represent processing functionality of a plurality of devices operating in coordination. Processor(s) 332 may be configured to execute modules 308, 310, 312, 314, 316, 318, 320, 322, 324 and/or 326, and/or other modules. Processor(s) 332 may be configured to execute modules 308, 310, 312, 314, 316, 318, 320, 322, 324 and/or 326, and/or other modules by software; hardware; firmware; some combination of software, hardware, and/or firmware; and/or other mechanisms for configuring processing capabilities on processor(s) 332. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, 322, 324 and/or 326 are illustrated in FIG. 3 as being implemented within a single processing unit, in implementations in which processor(s) 332 includes multiple processing units, one or more of modules 308, 310, 312, 314, 316, 318, 320, 322, 324 and/or 326 may be implemented remotely from the other modules. The description of the functionality provided by the different modules 308, 310, 312, 314, 316, 318, 320, 322, 324 and/or 326 described below is for illustrative purposes, and is not intended to be limiting, as any of modules 308, 310, 312, 314, 316, 318, 320, 322, 324 and/or 326 may provide more or less functionality than is described. For example, one or more of modules 308, 310, 312, 314, 316, 318, 320, 322, 324 and/or 326 may be eliminated, and some or all of its functionality may be provided by other ones of modules 308, 310, 312, 314, 316, 318, 320, 322, 324 and/or 326. As another example, processor(s) 332 may be configured to execute one or more additional modules that may perform some or all of the functionality attributed below to one of modules 308, 310, 312, 314, 316, 318, 320, 322, 324 and/or 326.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system may send a reminder to the user to confirm his or her privacy settings every six months or after every ten photo posts. In particular embodiments, privacy settings may also allow users to control access to the objects or information on a per-request basis. As an example and not by way of limitation, the social-networking system may notify the user whenever a third-party system attempts to access information associated with the user, and require the user to provide verification that access should be allowed before proceeding.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
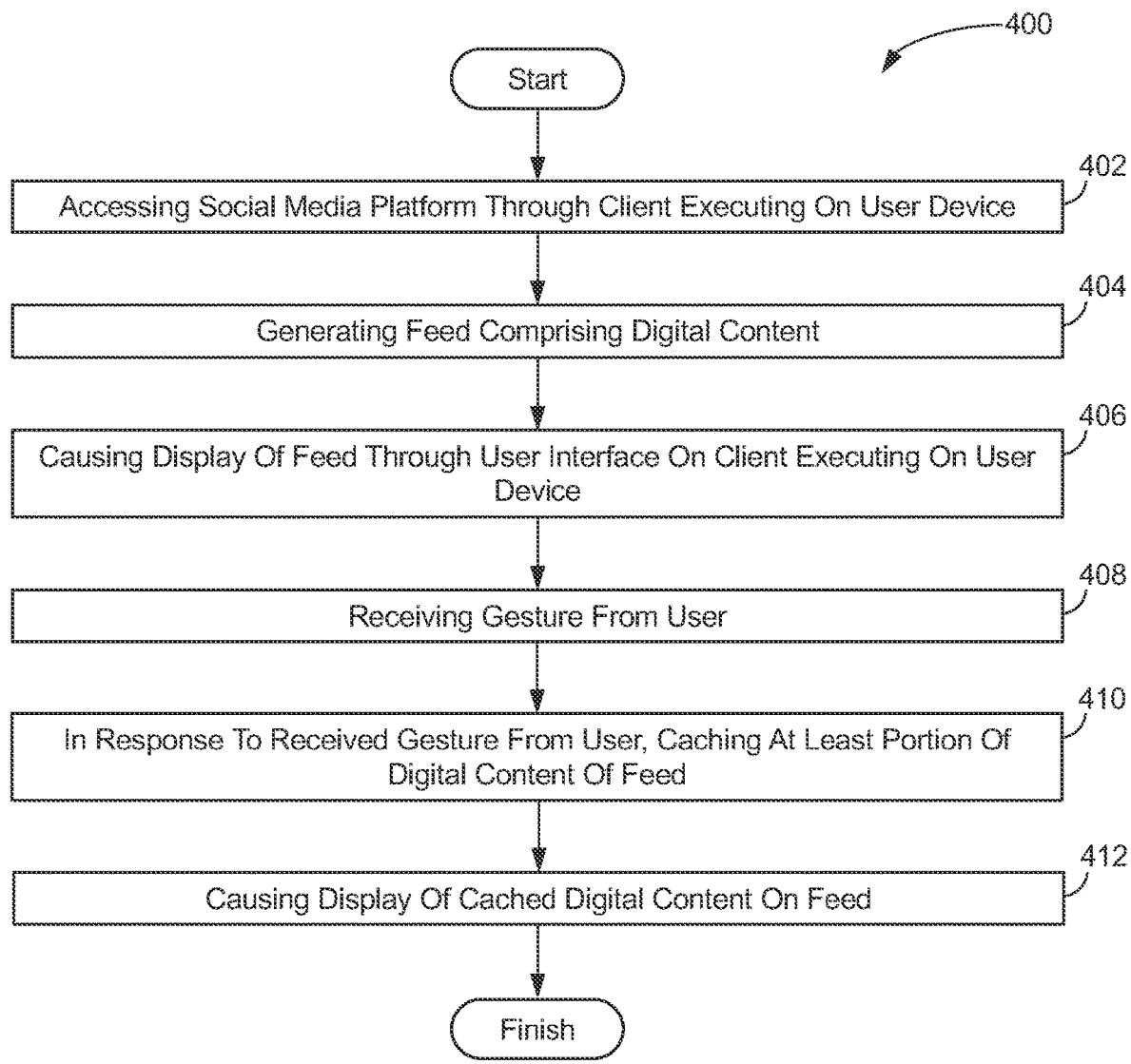
FIG. 4 illustrates an example flow diagram for caching digital content, according to certain aspects of the disclosure.

FIG. 4 illustrates an example flow diagram (e.g., process 400) for caching digital content, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At a step 402, the process 400 may include accessing a social media platform through a client executing on a user device. At a step 404, the process 400 may include generating a feed comprising digital content. At a step 406, the process 400 may include causing display of the feed through a user interface on the client executing on the user device. At a step 408, the process 400 may include receiving a gesture from a user. The gesture may include a swiping down motion. The swiping down motion may include at least one of a long pull or an extended pull (e.g., a mega pull) by the user. At a step 410, the process 400 may include, in response to the received gesture from the user, caching at least a portion of the digital content of the feed. At a step 412, the process 400 may include causing display of the cached digital content on the feed.

For example, as described above in relation to FIGS. 1-3, at a step 402, the process 400 may include accessing a social media platform through a client executing on a user device, through platform accessing module 308. At a step 404, the process 400 may include generating a feed comprising digital content, through feed generation module 310. At a step 406, the process 400 may include causing display of the feed through a user interface on the client executing on the user device, though display causing module 312. At a step 408, the process 400 may include receiving a gesture from a user, through gesture receipt module 314. The gesture may include a swiping down motion. The swiping down motion may include at least one of a long pull or an extended pull by the user. At a step 410, the process 400 may include, in response to the received gesture from the user, caching at least a portion of the digital content of the feed, though content caching module 316. At a step 412, the process 400 may include causing display of the cached digital content on the feed, through display causing module 312.

According to an aspect, the process 400 further includes, in response to the received gesture from the user, updating the digital content of the feed.

According to an aspect, the long pull comprises greater than 40% of an upper screen area of the user device.

According to an aspect, the extended pull comprises greater than 50% of an upper screen area of the user device.

According to an aspect, a color of a portion of the user interface changes when the user applies a long pull or an extended pull.

According to an aspect, the color of the portion of the user interface which changes when the user applies long pull is different from the color of the portion of the user interface which changes when the user applies the extended pull.

According to an aspect, the process 400 further includes caching comments related to the digital content of the feed.

According to an aspect, the process 400 further includes caching metadata related to the digital content of the feed.

According to an aspect, the long pull caches at least 50% of non-displayed content.

According to an aspect, the extended pull caches all non-displayed content.

According to an aspect, the process 400 further includes receiving a second gesture from the user consecutively after the gesture, the second gesture comprising at least one of a swipe left, swipe right, or button press.

According to an aspect, the second gesture allows the user to configure the caching.

According to an aspect, configuring the caching includes at least one of selecting the amount of content to be cached, adjusting expiration of cached content, selecting an amount of data to cache, selecting resolution options, selecting metadata to be cached, and selecting content type to be cached.

According to an aspect, the process 400 further includes displaying a prompt to the user during swiping down motion, before the gesture is a long pull or an extended pull, to inform the user of the effect of the long pull or the extended pull.

According to an aspect, the process 400 further includes providing feedback to the user before the gesture is a long pull or an extended pull.

According to an aspect, the feedback is at least one of haptic feedback, an audible sound, or a visual indicator.

According to an aspect, the process 400 further includes providing feedback to the user after the gesture is a long pull or an extended pull.

According to an aspect, the feedback is at least one of haptic feedback, an audible sound, or a visual indicator.

According to an aspect, the process 400 further includes displaying a confirmation of the caching at least a portion of the digital content of the feed.

According to an aspect, the process 400 further includes displaying an indicator during the swiping down motion of the gesture to indicate the amount of digital content to be cached.

According to an aspect, the process 400 further includes clearing at least a portion of the cached digital content after the expiration of a period of time.

According to an aspect, the process 400 further includes clearing at least a portion of the cached digital content after a second gesture by the user to refresh the digital content of the feed.

Figure 5:
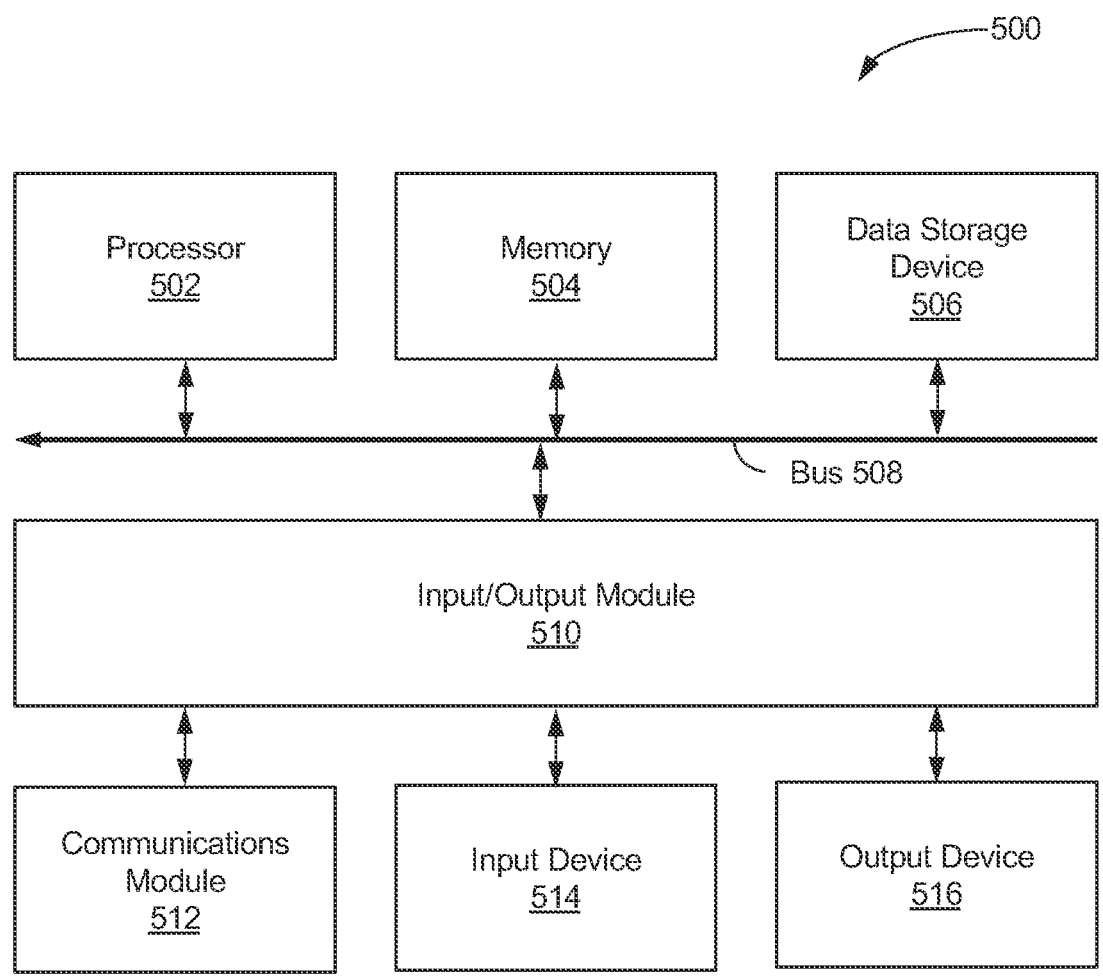
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for caching digital content, comprising:
   accessing a social media platform through a client executing on a user device;
   generating a feed comprising digital content;
   causing display of the feed through a user interface on the client executing on the user device;
   receiving a first gesture from a user, the first gesture comprising a swiping down motion, the swiping down motion comprising at least one of a long pull or an extended pull by the user;

indicating that the first gesture will result in a digital content caching request;

displaying two or more configuration indicators to further configure the digital content caching request, the two or more configuration indicators indicative of different amounts of digital content to be cached;

receiving a second gesture from the user based on the two or more configuration indicators, wherein a motion of the second gesture is transverse to the first gesture and a transition between the motion of the second gesture and the swiping down motion of the first gesture is discontinuous;

in response to receiving the first and second gestures from the user, caching the digital content of the feed; and causing display of the cached digital content on the feed.

2. The computer-implemented method of claim 1, further comprising:

in response to the received first gesture from the user, updating the digital content of the feed.

3. The computer-implemented method of claim 1, wherein the long pull comprises greater than 40% of an upper screen area of the user device.

4. The computer-implemented method of claim 1, wherein the extended pull comprises greater than 50% of an upper screen area of the user device.

5. The computer-implemented method of claim 1, wherein a color of a portion of the user interface changes when the user applies a long pull or an extended pull.

6. The computer-implemented method of claim 5, wherein the color of the portion of the user interface which changes when the user applies long pull is different from the color of the portion of the user interface which changes when the user applies the extended pull.

7. The computer-implemented method of claim 1, further comprising:

caching comments related to the digital content of the feed.

8. The computer-implemented method of claim 1, further comprising:

caching metadata related to the digital content of the feed.

9. The computer-implemented method of claim 1, wherein the long pull caches at least 50% of non-displayed content.

10. The computer-implemented method of claim 1, wherein the extended pull caches all non-displayed content.

11. A system configured for caching digital content, comprising:

one or more hardware processors configured by machine-readable instructions to:

access a social media platform through a client executing on a user device;

generate a feed comprising digital content;

cause display of the feed through a user interface on the client executing on the user device;

receive a first gesture from a user as a request to cache the digital content, the first gesture comprising a swiping down motion, the swiping down motion exceeding a distance necessary to cause a preliminary action;

during the first gesture from the user, cause a portion of the user interface to display a visual indicator to the user;

display two or more configuration indicators to further configure the request;

receive a second gesture from the user based on the two or more configuration indicators, the second gesture comprising a motion in a direction different from the first gesture and a transition between the motion of the second gesture and the swiping down motion of the first gesture is discontinuous;

in response to receiving the first and second gestures from the user, cache at least a portion of the digital content of the feed; and cause display of the cached digital content on the feed.

12. The system of claim 11, wherein the one or more hardware processors are further configured by machine-readable instructions to:

in response to the first and second gestures from the user, update the digital content of the feed.

13. The system of claim 11, wherein the preliminary action comprises a digital content feed refresh.

14. The system of claim 11, wherein the visual indicator comprises at least one of a text indicator of digital content caching or a graphical indicator of digital content caching.

15. The system of claim 11, wherein the visual indicator includes a change in a color of a portion of the user interface.

16. The system of claim 15, wherein the color of the portion of the user interface changes based on a distance of the swiping down motion of the first gesture.

17. The system of claim 11, wherein the one or more hardware processors are further configured by machine-readable instructions to:

cache comments related to the digital content of the feed.

18. The system of claim 11, wherein the one or more hardware processors are further configured by machine-readable instructions to:

cache metadata related to the digital content of the feed.

19. The system of claim 11, wherein the one or more hardware processors are further configured by machine-readable instructions to:

display an indicator of a status of the caching of the digital content of the feed.

20. A non-transient computer-readable storage medium having instructions embodied thereon, the instructions being executable by one or more processors to perform a computer-implemented method for caching digital content, the method comprising:

accessing a social media platform through a client executing on a user device;

generating a feed comprising digital content;

causing display of the feed through a user interface on the client executing on the user device;

receiving a first gesture from a user, the first gesture comprising a swiping down motion, the swiping down motion comprising at least one of a long pull or an extended pull by the user;

during the first gesture, causing display of a caching indicator to indicate that the first gesture will result in a digital content caching request;

causing display of two or more configuration indicators to further configure the caching request, the two or more configuration indicators indicative of different amounts of digital content to be cached;

receiving a second gesture corresponding to the two or more configuration indicators from the user to further configure the caching request, wherein the second gesture comprises a motion in a direction different from the first gesture, a transition between the motion of the second gesture and the swiping down motion of the first gesture is discontinuous, and the second gesture causes caching of an amount of digital content indicated by the two or more configuration indicators;

in response to the received first gesture and second gesture from the user, caching at least a portion of the digital content of the feed; and causing display of the cached digital content on the feed.

\* \* \* \* \*